United States Patent [19]

Renner

[11] Patent Number: 4,944,444
[45] Date of Patent: Jul. 31, 1990

[54] WELDING OR BURNING SHIELD

[75] Inventor: James S. Renner, Milford, Ohio

[73] Assignee: MK-Ferguson Company, Cleveland, Ohio

[21] Appl. No.: 467,321

[22] Filed: Jan. 18, 1990

Related U.S. Application Data

[63] Continuation of Ser. No. 369,735, Jun. 22, 1989, abandoned.

[51] Int. Cl.⁵ .................. B23K 9/32; B23K 28/02; F16P 1/06
[52] U.S. Cl. ....................... 228/59; 228/214; 228/21; 228/57; 219/59.1
[58] Field of Search ............... 228/19, 21, 44.5, 59, 228/57, 214; 219/59.1, 61.12; 285/286

[56] References Cited

U.S. PATENT DOCUMENTS

| | | | |
|---|---|---|---|
| 2,410,306 | 10/1946 | Romberg | 228/59 |
| 2,823,634 | 2/1958 | Barth | 228/44.5 |
| 3,095,844 | 7/1963 | Thielsch | 228/44.5 |
| 4,159,072 | 6/1979 | Lajoie et al. | 228/49.3 |
| 4,355,664 | 10/1982 | Cook et al. | 228/214 |
| 4,496,093 | 1/1985 | Taylor, Jr. | 228/44.5 |

*Primary Examiner*—Richard K. Seidel
*Assistant Examiner*—Samuel M. Heinrich
*Attorney, Agent, or Firm*—Calfee, Halter & Griswold

[57] ABSTRACT

The invention provides a portable welding or cutting shield to assist in preventing welding or burning by-products from contaminating or damaging the inside surfaces of a pipe. The portable welding shield comprises a shield assembly for capturing the by-products released within and traveling along the length of the pipe, a leg assembly for supporting the shield assembly within the pipe and a splatter target that extends upwardly from the shield assembly. The leg assembly includes fixed first and second legs, and an adjustable third leg. The adjustable leg includes a screw actuator that allows the length of the leg to be radially adjusted so as to allow the leg assembly to be brought in and out of engagement with the inside diameter of the pipe. The shield assembly includes multiple flexible pieces of flame resistant fabric sandwiched between a top and a bottom pair of semi-circular plates. The pieces of fabric have a diameter greater than that of the inner diameter of the pipe such that the fabric contacts substantially the entire inside diameter of the pipe at a particular location along the length of the pipe. The semi-circular plates are capable of folding inwardly upon themselves so as to facilitate the insertion of the shield assembly within the pipe. Located above the shield assembly is a splatter target. The splatter target serves to capture by-products traveling across the inside diameter of the pipe.

18 Claims, 4 Drawing Sheets

WELDING OR BURNING SHIELD

This is a continuation of copending application Ser. No. 369,735 filed on June 22, 1989 now abandoned.

DISCLOSURE OF THE INVENTION

The present invention relates to a shield for use during welding or burning operations. More particularly, the invention relates to a portable welding or cutting shield for use within a pipe which serves to help prevent welding or burning by-products and other foreign bodies traveling within a pipe from damaging or contaminating the inside diameter of the pipe or equipment contained within or attached to the pipe.

BACKGROUND

Welding and burning operations generate a considerable amount of by-products such as molten metal, dross and flux. During many welding or burning operations, such as, for example, plasma cutting or burning operations, temperatures in excess of 30,000° F. are generated and high temperature by-products are produced. When burning or welding a pipe, these high temperature welding or burning by-products can burn or disfigure the inside diameter or inside surface of a pipe requiring that the inside diameter of the pipe be reconditioned by such methods as machining, wire brushing or grinding. These reconditioning operations can become quite costly, and sometimes it is not possible to recondition the pipe and thus the pipe must be scrapped. In addition to damaging or contaminating the pipe being welded or burned, such by-products can travel down along the inside length of the pipe and damage equipment located within the pipe or attached to the pipe.

Upon completion of or during the burning or welding operation, it may be necessary to machine or grind a specific surface configuration on the pipe. Duing these grinding or machining operations pieces of metal, abrasives, dust and other foreign bodies are generated. Preferably, means are provided to prevent these foreign bodies from traveling down along the inside length of the pipe and contaminating equipment located within the pipe or attached to the pipe.

In an attempt to prevent damage or contamination to the inside diameter or inside surface of a pipe during burning or welding operations, welders have utilized pieces of flame-resistant fabric. More particularly, welders have taken pieces of flame-resistant fabric and cut them into various shapes and forms. The shaped pieces of flame-resistant fabric are then positioned or stuffed within the pipe in such a manner as to attempt to provide a barrier within the pipe. Unfortunately, this technique is not very effective for it many times does not result in a satisfactory barrier being produced within the pipe. In addition, this technique may consume a considerable amount of time in cutting and positioning the fabric within the pipe.

The prior art further provides a device for providing a barrier within a pipe that is being welded or burned. This device comprises a drum having a pair of rubber tubes disposed along its outer diameter. Once the drum is properly positioned within the pipe, the tubes are inflated to seal against the inside diameter of the pipe in order to produce a barrier within the pipe. This device is somewhat bulky and it can be quite difficult to position within the pipe. Additionally, the rubber tubes can become damaged and rendered inoperative by contact with the welding or burning by-products. Furthermore, this device has no provisions for capturing by-products traveling across the inside diameter of the pipe.

SUMMARY OF THE INVENTION

The present invention provides a portable welding or cutting shield for helping to prevent welding or burning by-products and other foreign bodies from contaminating or damaging the inside of a pipe that can be quickly and easily installed within a pipe. In addition to being capable of capturing welding or burning by-products or foreign bodies traveling along the length of a pipe, the welding shield is also capable of blocking by-products traveling across the inside diameter of the pipe.

The welding shield comprises a shield assembly for capturing the by-products and foreign bodies traveling along the length of the pipe, a leg assembly for supporting the shield assembly within the pipe, and a splatter target that extends from the shield assembly and serves to capture by-products traveling across the inside diameter of the pipe. Because the welding shield comprises essentially three separate assemblies, installation, removal and transportation of the welding shield is generally more easily undertaken as compared to the one piece drum-like device provided by the prior art.

The leg assembly includes three equally circumferentially spaced legs for securely engaging the inside diameter of the pipe. The first and second legs comprise fixed legs. The third leg is radially adjustable and includes a screw actuator for adjusting its radial length so as to allow the radially outer shoe thereon, to be brought into and out of engagement with the inside diameter of the pipe. The actuator is controlled by a remote control box, which is electrically powered by a remote battery, such as the 12 volt battery of an automobile or truck.

The shield assembly includes a plurality of flexible pieces of flame-resistant fabric sandwiched between a top pair of semi-circular plates and a bottom pair of semi-circular plates. The pieces of fabric have a diameter that is greater than the inside diameter of the pipe, whereas each pair of semi-circular plates forms a diameter that is less than the inside diameter of the pipe. The top pair of plates are hinged together so as to allow those plates to be folded inwardly upon themselves thereby facilitating the insertion of the shield assembly within a pipe. Once the leg assembly has been secured within the pipe and the shield assembly positioned upon and supported by the leg assembly, the plates are unfolded such that the pieces of fabric are compressed and substantially flattened to contact the inside diameter of the pipe, thereby providing a barrier across the entire inside diameter of the pipe and a circumferential seal at a particular location along the pipe's length.

A splatter target is connected to and extends upwardly from the shield assembly. The splatter target comprises an upright standard having a plurality of rectangular vanes extending radially outwardly from the distal end of the upright standard. The splatter target serves to capture by-products traveling generally across the inside diameter of the pipe.

The welding shield is utilized by first placing the leg assembly within the pipe at a desired position. Once the leg assembly has been properly positioned, the actuator is energized driving the adjustable leg radially outwardly to engage the inside diameter of the pipe and to wedge each of the legs into secure engagement with the inside diameter of the pipe. After the leg assembly is properly secured, the shield assembly is placed upon the leg assembly over and around a connector stub supported thereby. The standard of the splatter target is then inserted into the connector stub to position the vanes of the splatter target away from the shield assembly generally along the pipe length.

The foregoing and other features of the invention are hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
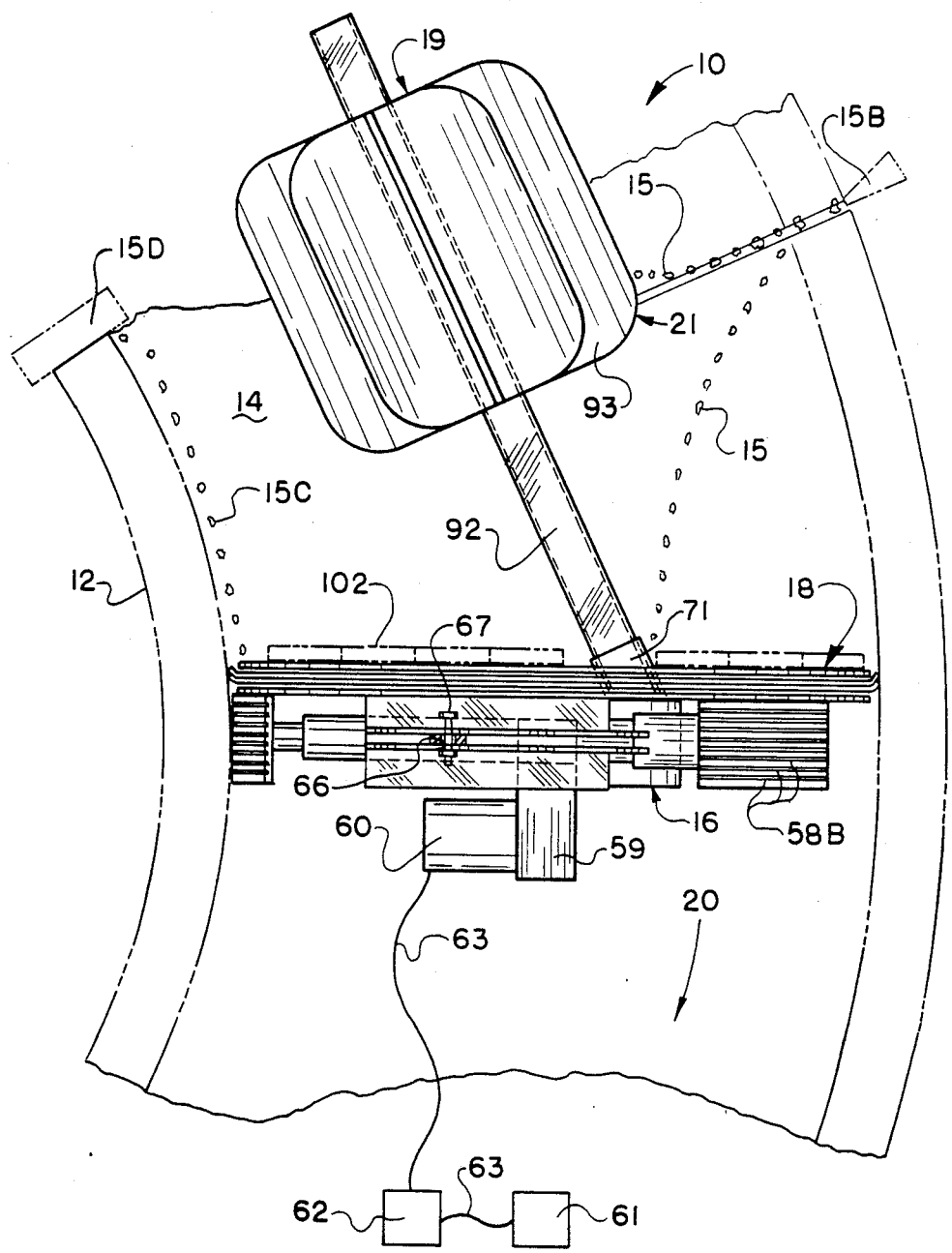
FIG. 1 is a side elevational view of a portable welding or burning shield made in accordance with the present invention mounted within a length of pipe shown in section and broken-away for clarity of illustration.

Referring to the drawings and initially to FIG. 1, a portable welding or burning shield, made in accordance with the principles of the present invention, is indicated generally at 10. Welding shield 10 is designed for use within the inside of a generally circular pipe 12 and serves to help prevent the inside diameter or inner sidewall or surface 14 of the pipe 12 from being damaged or contaminated by burning or welding by-products 15 (schematically shown) that are produced during the welding or burning 15B (schematically shown) of the pipe 12 or foreign bodies 15C (schematically shown) generated during grinding or machining operations 15D (schematically shown). Welding shield 10 may be quickly and easily inserted and installed in pipe 12 and serves to capture by-products 15 traveling both axially along and radially across pipe 12.

During welding or burning operations 15B, a considerable amount of welding by-products 15 such as flux, dross and molten metal are generated. Many of these welding and burning operations produce extremely high temperatures. For example, during plasma cutting, temperatures can exceed 30,000° F. Thus, the by-products generated during welding or burning operations are also at a very high temperature and are capable of damaging or contaminating the inside diameter of a pipe.

The by-products 15 are released from the inside diameter 14 of the pipe 12 in the proximity of the welding or burning operation 15B. As the by-products 15 enter the confines of the pipe 12 and contact the inside diameter 14 of the pipe 12, the inside diameter 14 can become contaminated or damaged. More particularly, without the use of welding shield 10, the by-products 15 can embed themselves into or disfigure the inside diameter 14 of the pipe 12, or the by-products 15 can travel along the length of pipe 12 and possibly damage or contaminate equipment attached to the pipe. Depending upon the application for which a pipe is intended, the grinding, buffing, or wire brushing of the inside diameter of a pipe may be required as a result of damage or contamination from welding or burning by-products. If the damage inflicted to a pipe by the by-products is severe, the pipe may be rendered unrepairable and thus reduced to nothing more than scrap. Welding shield 10 serves to capture the by-products 15 before they damage the inside diameter 14 of the pipe 12 or travel uncontrolled along the length of the pipe 12 and contaminate or damage equipment attached to pipe 12.

Upon completion of or during the burning or welding operation 15B, it may be necessary to machine or grind a specific surface or configuration on the pipe 12. During these grinding or machining operations pieces of metal, abrasives, dust and other foreign bodies 15C are generated. Welding shield 10 serves to capture the foreign bodies 15C and prevent them from traveling down along the inside length of the pipe 12 and contaminating equipment located within the pipe 12 or attached to the pipe 12. In addition to serving as a device for preventing damage or contamination due to welding or burning by-products 15 and foreign bodies 15C, welding shield 10 may also serve in nuclear applications to help control radiation emanating from pipe 12 during welding or burning operations 15B and machining or grinding operations 15D as discussed in further detail below.

Generally, welding shield 10 comprises a leg assembly, indicated generally at 16, a shield assembly, indicated generally at 18, and a splatter target, indicated generally at 19. With a vertically extending pipe, shield assembly 18 serves to limit the travel of by-products 15 moving substantially vertically or downwardly along the length 20 of the pipe 12. Splatter target 19 extends upwardly from the shield assembly 18 and serves to limit the travel of the by-products 15 moving substantially horizontally or across the inside diameter 14 of pipe 12. Leg assembly 16 serves to securely support the splatter target 19 and shield assembly 18 in position within the pipe 12.

Figure 2:
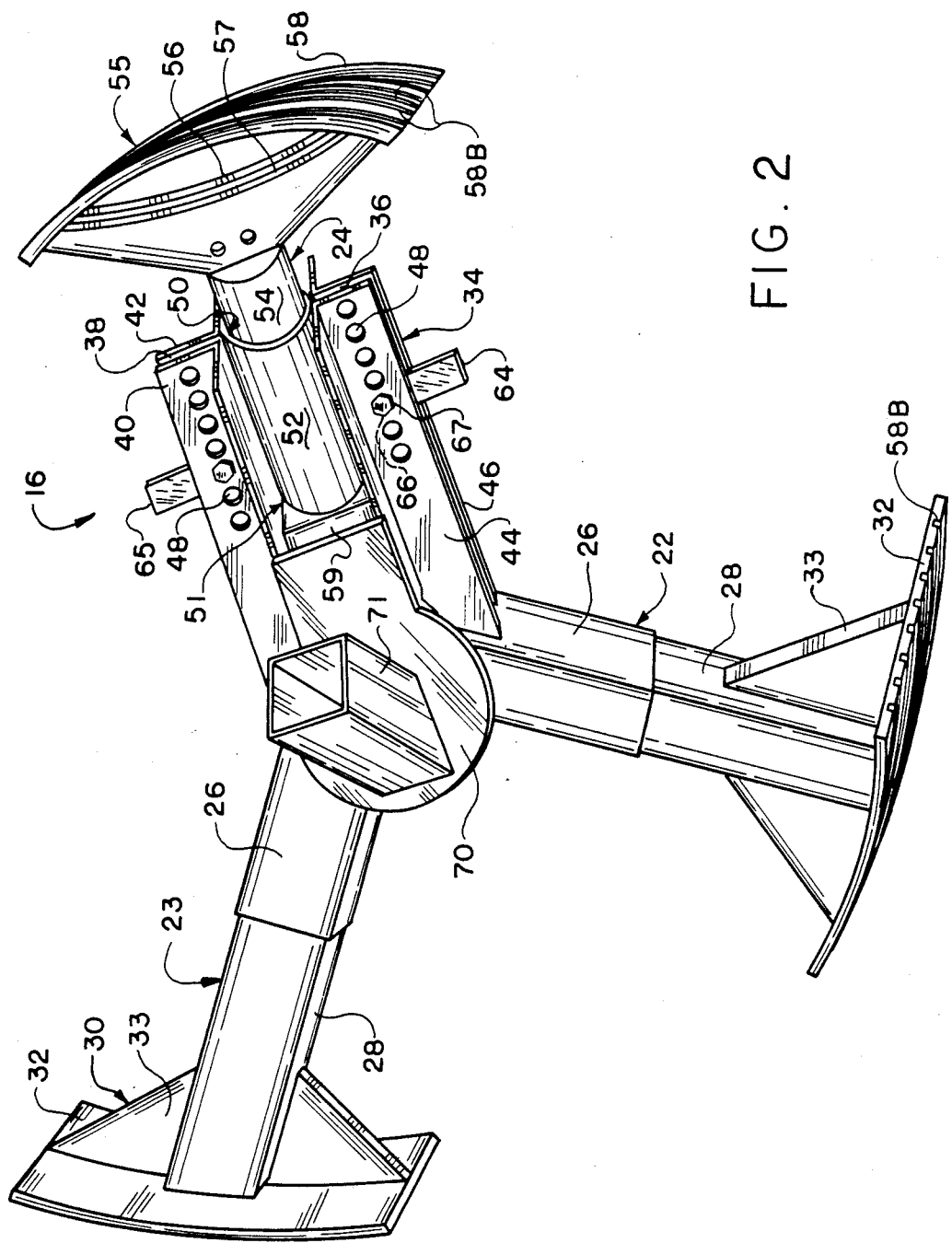
FIG. 2 is a top perspective view of the leg assembly of the welding shield shown in FIG. 1, with the splatter target and shield assembly removed.
Figure 3:
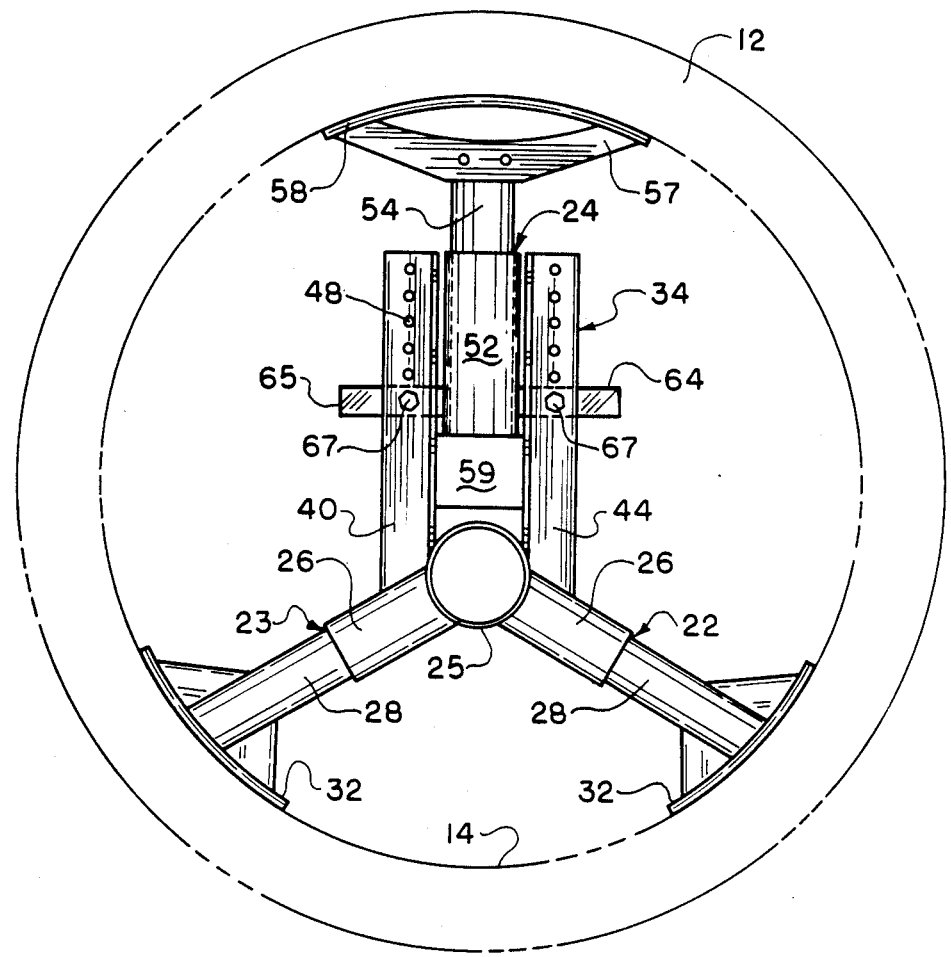
FIG. 3 is a top plan view of the leg assembly of the welding shield with the three shoes on the circumferentially spaced legs in contact with the inside diameter of the pipe.

Referring additionally to FIGS. 2 and 3, leg assembly 16 comprises a first leg 22, a second leg 23 and a third leg 24. Connecting the proximate ends of legs 22, 23 and 24 is hub 25. Legs 22, 23 and 24 are equally circumferentially spaced around the outer diameter of the hub 25. Legs 22 and 23 are fixed and thus are not capable of being radially retracted or extended. Each fixed leg 22 and 23 comprises an inner square tube 26 mounted to hub 25 and a slightly smaller outer square tube 28 mounted at the distal end of the inner tube 26. Mounted at the distal end of the outer tube 28 of each fixed leg is a shoe 30. Each shoe 30 includes a rectangular shape pad 32 and a pair of triangular reinforcing ribs 33 mounting the pad on outer tube 28. Each pad 32 is curved so as to conform to and provide a major area of contact with the inside diameter 14 of the pipe 12.

Leg 24 is an adjustable leg and includes a mounting assembly, indicated generally at 34, having a pair of slots 36 and 38 which are diametrically opposed to one another. Slots 36 and 38 are respectively formed by a first pair of angles 40 and 42 extending from the inner tube 26 of leg 23 and by a diametrically opposed second pair of angles 44 and 46 extending from the inner tube 26 of leg 22. Two rows of aligned openings 48 are respectively located at and extend through the distal end portion of angles 40 and 42 on one side and 44 and 46 on the other side. Disposed between angles 40, 42, 44 and 46 is an actuator assembly 50.

Actuator assembly 50 includes an ACME screw, indicated generally at 51, having a cylinder 52 and a radially adjustable piston 54. Fastened at the distal end of the piston 54 is a shoe, indicated generally at 55, having a pair of reinforcing ribs 56 and 57 mounted to a curved pad 58 for contacting the inside diameter 14 of pipe 12. Preferably, each of the pads 32 and 58 include a plurality (about six) of grooves 58B extending horizontally along the outer surface of the pads to enhance the bit of the pads with the sidewall 14. The grooves are preferably about ⅛" deep and about ⅛" wide.

Actuator assembly 50 also includes a screw mechanism 59 which is driven by a 12 volt electric motor 60. Motor 60 and screw mechanism 59 serve to radially extend and retract the piston 54 relative to the cylinder 52 thereby allowing leg assembly 16 to be manipulated into and out of engagement with the inside diamter 14 of pipe 12. Motor 60 and screw mechanism 59 are preferably powered by a remote power source such as a 12 volt automotive or truck battery 61 (schematically illustrated) and controlled by a remote control box 62 (schematically illustrated). Electrically interconnecting the control box 62, battery 61 and screw mechanism 59 is a power cable 63. An example of a screw actuator assembly suitable for use with the present invention is an ACME screw actuator assembly sold under the trademark BURR by the Engineering & Development Corp. of Battle Creek, Mich.

Mounted along the outer sidewalls of cylinder 52 are a pair of outwardly extending ears or flanges 64 and 65 which are received within and pass through slots 38 and 36 respectively. Openings 66 are provided in flanges 64 and 65 in order to allow fasteners 67 to extend through the aligned holes in the respective angles and flanges, thereby to secure the cylinder 52 relative to the angles 40, 42, 44 and 46. Depending upon which of the aligned openings 48 are utilized, the length of leg 24 may be varied. More particularly, utilization of holes 48 that are closer to hub 25 results in leg 24 being shorter as compared to using holes 48 that are further from hub 25.

Adjustable leg 24 thus provides for radial adjustment through both the actuator assembly 50 and mounting assembly 34. Therefore, leg assembly 18 may be utilized with pipes of various diameters. However, it will be appreciated that depending upon the particular diameter of a pipe, pads 32 and 57 located at the distal ends of the legs 22, 23 and 24 may require modification (i.e., the size and radius of the pads) in order to ensure sufficient contact and thus engagement with the inside diameter of the pipe.

Mounted upon the top of the hub 25 and at the proximate ends of angles 40 and 44 is a base plate 70. Mounted upon the base plate 70 is a connector stub 71. Base plate 70 serves as a support for the shield assembly 18. Connector stub 71 serves to receive and support the splatter target 19.

Figure 4:
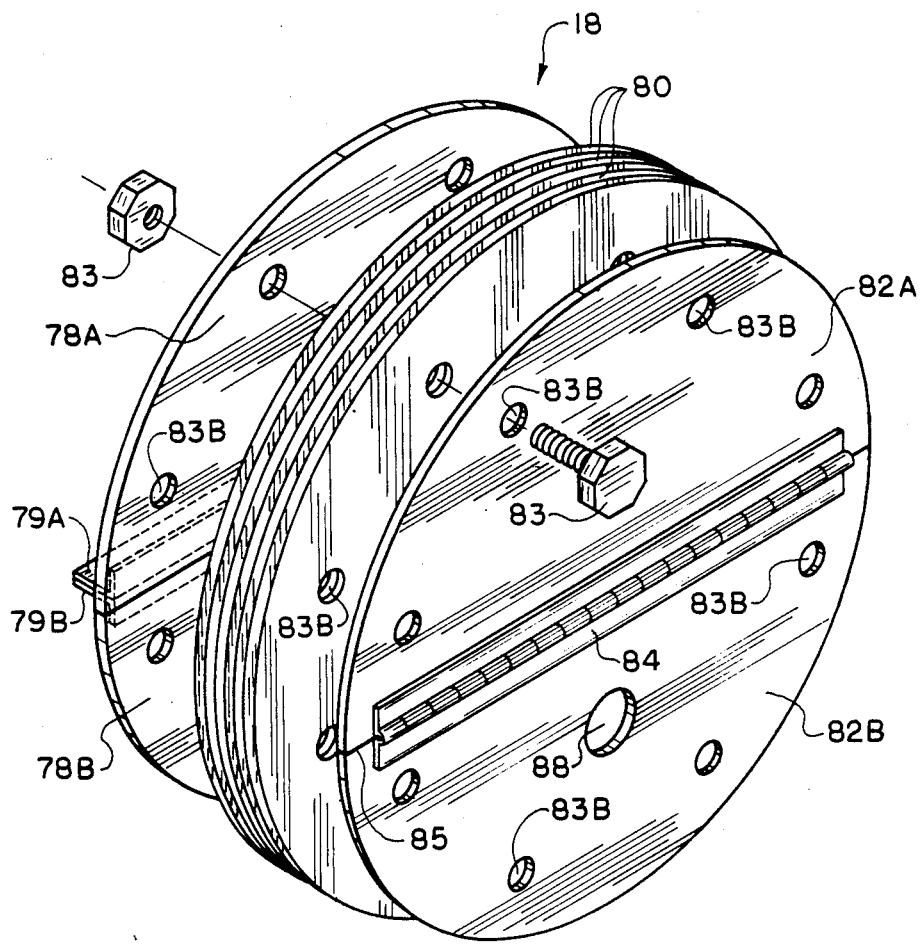
FIG. 4 is an exploded perspective view of the various elements of the shield assembly of the welding shield shown in FIG. 1.

As shown in FIG. 4, shield assembly 18 comprises a bottom pair of semi-circular plates 78A and 78B. Located along the straight inner edges of semi-circular plates 78A and 78B on the backside of such plates are angles 79A and 79B. Semi-circular plates 78A and 78B are not secured together.

Located on top of the bottom plates 78A and 78B are a plurality of flexible circular pieces of thermal barrier or fire-resistant fabric 80. Fabric 80 must comprise a fire-resistant fabric that can withstand the high temperatures of the welding and/or burning by-products 15 that emanate from the welding or burning operation 15B.

An example of a fire-resistant fabric that is suitable for use in the present invention is a fabric sold under the registered trademark SILTEMP by Ametek, Haveg Division, of Wilmington, Del.

Disposed above fabric 80 are a top pair of semi-circular plates 82A and 82B that are pivotally connected by a hinge 84. Connecting the respective plates 78A to 82A, and 78B and 82B, and the pieces of fabric 80 are fasteners 83 (only one of which is illustrated) positioned along the outside diameter of such elements and passing through holes 83B. Hinge 84 allows the shield assembly 18 to be folded along parting edge 85. More particularly, hinge 84 allows the plates 78A and 82A, 78B and 82B, and fabric 80 to collapse together. Such folding facilitates the transportation of the shield assembly 18 and also allows easier positioning of the shield assembly 18 within the pipe 12. Once the shield assembly 18 is properly positioned upon the leg assembly 16 by passing the connector stub 71 through the aligned opening 88 in shield assembly 18, the plates 78A and 82A, and 78B and 82B can then be unfolded thereby causing the fabric 80 to be substantially flattened with the outer edges of the fabric 80 contacting the inside diameter 14 of pipe 12 at a particular position along pipe 12. Upon complete unfolding, the upstanding legs 86 of angles 79A and 79B contact one another as a stop thereby helping to ensure that the bottom plates 78A and 78B are supported in a horizontal plane.

In order to permit the insertion of plates 78A, 78B, 82A and 82B within pipe 12, such plates must have a diameter less than that of the pipe 12. Fabric 80 preferably has a diameter that is slightly greater than the inner diameter 14 of the pipe 12. The diameter of fabric 80 is slightly greater so as to help ensure that the radially outer edges of fabric layers 80 contact the entire inside diameter 14 of pipe 12 when plates 78A and 82A, and 78B and 82B are unfolded thereby providing a substantially complete barrier or circumferential seal within pipe 12 at a single location along the length of pipe 12.

Splatter target 19 extends upwardly from shield assembly 18 and comprises an upright standard or square tube 92 which is received and frictionally mounted within connector stub 71. Located near the distal end of square tube 92 are a plurality of equally circumferentially spaced rectangular vanes 93. Vanes 93 extend radially outwardly, substantially perpendicular to the major axis of the upright standard 92. Vanes 93 serve to capture any by-products 15 that are traveling substantially horizontally or across the inside diameter 14 of pipe 12. Although in the preferred embodiment upright standard 92 extends at about an 80° angle relative to the shield assembly 18, it will be appreciated that connector stub 71 and standard 92 may be modified such that the standard 92 extends at any one of a variety of angles thereby allowing splatter target 19 to function in pipes of various curved angles, configurations or spatial orientations.

Welding shield 10 is preferably constructed primarily of a metal, such as steel, and all of the various elements of the welding shield are preferably connected by welds or fasteners. However, it will be appreciated that the invention contemplates the use of any one of a variety of materials such as, for example, aluminum or plastic composites and the use of any one of a variety of fastening techniques.

Welding shield 10 is utilized by first placing the leg assembly 16 within the pipe 12 at the desired position by hand, or with the help of a crane or other mechanical device. Once the leg assembly 16 has been properly positioned, the motor 60 is energized using the remote control box 62 and the battery 61, thereby causing leg 24 to radially extend and wedge the pads 32 and 37 of each of the legs 22, 23 and 24 securely against the inside diameter 14 of the pipe 12. As the adjustable leg 24 is extended, the legs 22 and 23 elastically distort (as a result of the outer tubes 28 being of a smaller dimension that the inner tubes 26), thereby providing a spring or biasing force that helps to secure the leg assembly 16 after the motor 60 is no longer being energized.

After the leg assembly 16 is secured within the pipe 12, the folded shield assembly 18 is placed upon the leg assembly 16 with the opening 88 in plates 78B and 82B and fabric 80 aligned with and receiving connector stub 71. The plates 78A and 82A, and 78B and 82B are then unfolded around hinge 84 such that they extend horizontally within pipe 12 and the fabric 80 abuts the inside diameter 14 of pipe 12. Finally, the upright standard 92 of the splatter target 19 is inserted into the connector stub 71.

Preferably, welding shield 10 is located within pipe 12 such that the splatter target 19 is aligned as shown in FIG. 1 with the portion of the pipe 12 being burned or welded. At this location, the vanes 93 of the splatter target 19 serve to obstruct and block the majority of the by-products 15 emanating from the portion of the pipe 12 being welded or burned.

In addition to serving as a device for controlling and preventing damage or contamination by welding and burning by-products 15 and foreign bodies 15C, shield assembly 10 may also be used as a platform for supporting lead bricks or plates 102 within pipe 12 as shown in FIG. 1. The ability to support lead bricks 102 is useful in applications wherein the pipe that is being welded or burned has radiation emanating from its interior. Such lead bricks or plates 102 serve to help dissipate the radiation emanating from the pipe thereby helping to shield individuals working in the proximity of the pipe.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A portable shield for preventing welding or burning by-products and other foreign bodies traveling substantially along or across a pipe from contaminating the inside diameter of the pipe comprising:
   a shield assembly for support within the pipe that spans across and contacts the inside diameter of the pipe and limits the movement of by-products and foreign bodies traveling substantially along the pipe; and
   a splatter target that is connected to and extends from said support member for limiting the movement of welding by-products traveling across the inside diameter of the pipe.

2. A portable welding shield for preventing welding or burning by-products or other foreign bodies from contaminating or damaging the inside diameter of a longitudinally extending pipe comprising:
   a support means for securely engaging the inside diameter of the pipe; and
   a shield assembly supported upon said support means, said shield assembly comprising a flexible piece of flame-resistant fabric sandwiched between a bottom pair of semi-circular plates and a top pair of semi-circular plates having a diameter less than that of the inner diameter of the pipe, said fabric having a diameter greater than that of the inner diameter of the pipe such that upon placement of said shield assembly within the pipe said fabric contacts the inside diameter of the pipe along substantially the entire diameter of the pipe, said top plates being hinged so as to allow said top plates and said bottom plates to fold inwardly upon themselves so as to allow said fabric to deform while said shield assembly is being positioned in the pipe and returned to an unfolded position such that said fabric is substantially flattened once said shield assembly has been properly positioned within the pipe.

3. A shield for use within the inside diameter of a longitudinally extending pipe comprising:
   a shield assembly for providing a substantially planar surface within the pipe; and
   a support means for engaging the inside diameter of the pipe and securely supporting said shield assembly within the pipe, said support means comprising a first, second and third leg for engaging the inside diameter of the pipe, said first and second legs comprising fixed legs, said third leg comprising an adjustable leg including an actuator that allows the length of said third leg to be radially adjusted so as to allow said support means to be brought into and out of engagement with the inside diameter of the pipe.

4. A portable shield as set forth in claim 1 further including a leg assembly for supporting said shield assembly within the pipe, said leg assembly comprising a first, second and third leg for engaging the inside diameter of the pipe and supporting said shield assembly within the pipe.

5. A portable shield as set forth in claim 4 wherein said first and second legs comprise fixed legs and said third leg includes an actuator that allows the radial length of said third leg to be adjusted so as to allow said leg assembly to be manipulated into and out of engagement with the inside diameter of the pipe.

6. A portable shield as set forth in claim 5 wherein said first, second and third legs each include a shoe having an arcuate pad, said pads serving to help ensure the secure engagement of said leg assembly with the inside diameter of the pipe.

7. A portable shield as set forth in claim 6 wherein said third leg is adjustably mounted so as to facilitate the radial positioning of said actuator relative to said first and said second legs.

8. A portable shield as set forth in claim 4 wherein said shield assembly includes a piece of flame-proof fabric, said fabric having a diameter greater than the inside diameter of the pipe.

9. A portable shield as set forth in claim 8 wherein said shield assembly further includes a first pair of semi-circular plates and a second pair of semi-circular plates located on said fabric such that said fabric is sandwiched between said first and second pairs of plates, one of said pairs of plates being hinged so as to allow said two pairs of plates to fold inwardly towards one another prior to the insertion of said shield assembly into the pipe so as to allow said shield assembly to be easily positioned in the pipe, said two pairs of plates also being capable of swinging outwardly and returning to an unfolded position such that said fabric is substantially flattened once said shield assembly has been properly positioned upon said leg assembly.

10. A portable shield as set forth in claim 4 wherein said splatter target comprises a standard connected to and extending from said shield assembly, said standard having mounted near its distal end a plurality of rectangular-shape vanes extending generally radially outwardly, substantially perpendicular to the major axis of said standard.

11. A portable shield as set forth in claim 10 further including a control box for controlling the operation of said actuator.

12. A portable shield as set forth in claim 11 further including a battery for providing electrical power to operate said actuator.

13. A portable shield as set forth in claim 12 wherein said first leg and said second leg each comprise an inner tube of a first dimension and an outer tube of a second dimension which is less than said first dimension of said inner tube, said inner tubes and said outer tubes serving to provide a biasing force which retains said leg assembly in engagement with the inner diameter of the pipe once said actuator is no longer being energized.

14. A portable shield as set forth in claim 13 wherein one of said first pair of plates is fastened to one of said second pair of plates and said other of said first pair of plates is fastened to the other of said second pair of plates.

15. A shield for use within the inside diameter of a longitudinally extending pipe comprising:
   a shield assembly for providing a substantially planar surface within the pipe; and
   a support means for engaging the inside diameter of the pipe and securely supporting said shield assembly within the pipe, said support means comprising at least two legs for engaging the inside diameter of the pipe, at least one of said legs comprising an adjustable leg including an actuator that allows the length of said adjustable leg to be radially adjusted so as to allow said support means to be brought into and out of engagement with the inside diameter of the pipe.

16. A portable shield as set forth in claim 15 wherein at least one of said legs comprises a fixed leg.

17. A portable shield as set forth in claim 16 wherein said adjustable leg is adjustably mounted so as to facilitate the radial positioning of said actuator relative to said fixed leg.

18. A portable shield as set forth in claim 17 wherein said legs each include a show having an arcuate pad, said pads serving to help ensure the secure engagement of said leg assembly with the inside diameter of the pipe.

* * * * *